United States Patent [19]

Falconi

[11] 4,311,719
[45] Jan. 19, 1982

[54] PROCESS FOR THE PRODUCTION OF COOKED MACARONI FOODS AND A PLANT WITH WHICH TO EFFECT THE SAID PROCESS

[76] Inventor: Sergio Falconi, via Alcide de Gasperi, San Nicolo a Tordino (Teramo), Italy

[21] Appl. No.: 87,687

[22] Filed: Oct. 23, 1979

[30] Foreign Application Priority Data

May 16, 1978 [IT] Italy .............................. 49378 A/78

[51] Int. Cl.³ ............................................ A47J 37/00
[52] U.S. Cl. ...................................... 426/557; 99/349; 99/353; 99/423; 239/103; 239/120; 426/558; 426/451; 426/502
[58] Field of Search ............... 426/523, 557, 451, 496, 426/502, 471, 458, 558; 99/349, 353, 443 C, 423, 422, 426, 427, 373; 239/103, 120, 288, 590.3

[56] References Cited

U.S. PATENT DOCUMENTS

| | | | |
|---|---|---|---|
| 2,366,366 | 1/1945 | Souder | 426/557 |
| 2,615,809 | 10/1952 | Jean | 426/451 X |
| 3,267,877 | 8/1966 | Thiele et al. | 99/373 |
| 3,349,724 | 10/1967 | Tavan | 99/423 |
| 3,481,284 | 12/1969 | Cambanis | 99/423 X |
| 3,830,946 | 8/1974 | Ruhdorfer | 426/558 |
| 3,881,404 | 5/1975 | Ohkawa | 99/353 |
| 3,994,215 | 11/1976 | Rabeler | 99/353 |

FOREIGN PATENT DOCUMENTS

| | | | |
|---|---|---|---|
| 7329061 | 3/1975 | France | 99/423 |
| 2301183 | 2/1976 | France . | |
| 1278526 | 6/1972 | United Kingdom | 99/427 |
| 1480964 | 7/1977 | United Kingdom . | |

*Primary Examiner*—Billy J. Wilhite
*Attorney, Agent, or Firm*—Browdy and Neimark

[57] ABSTRACT

A process for the production and the contemporaneous cooking of macaroni foods uses, fundamentally, a liquid mixture of the basic ingredients required for the product it is wished to make, the mixture being sprayed, through nebulization devices onto one or more surfaces heated to the macaroni cooking temperature. The surfaces can be shaped in such a way as to render possible the cutting or shaping of the finished product contemporaneously with the production thereof.

14 Claims, 8 Drawing Figures

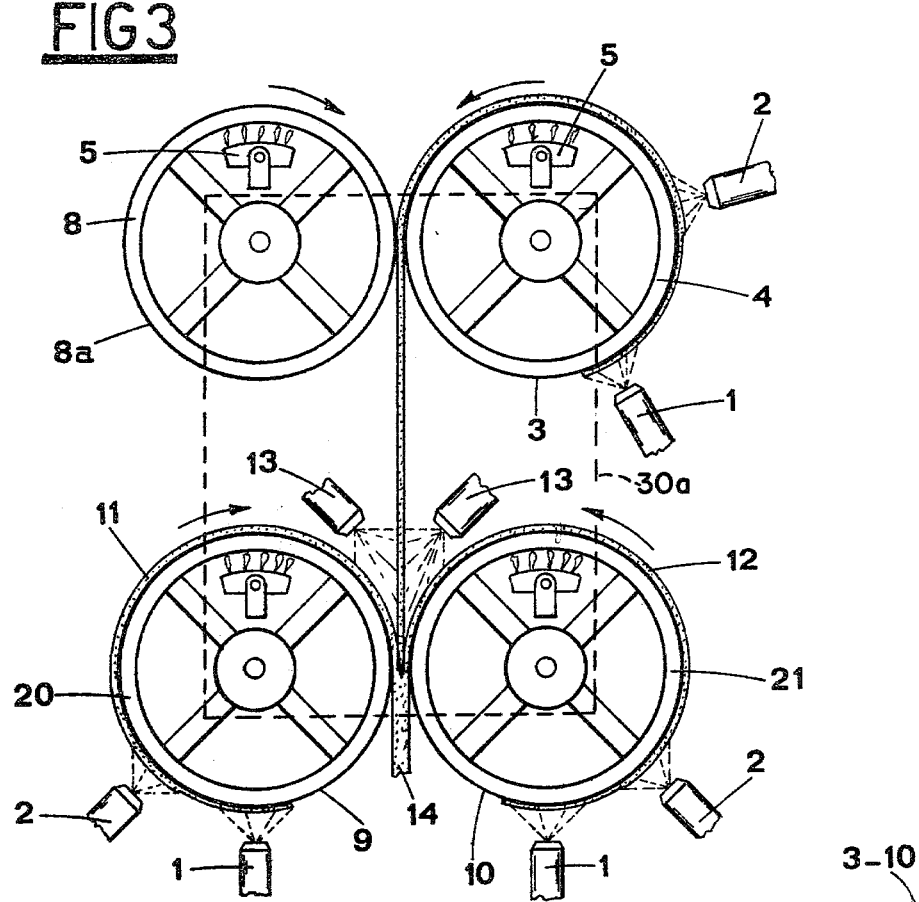

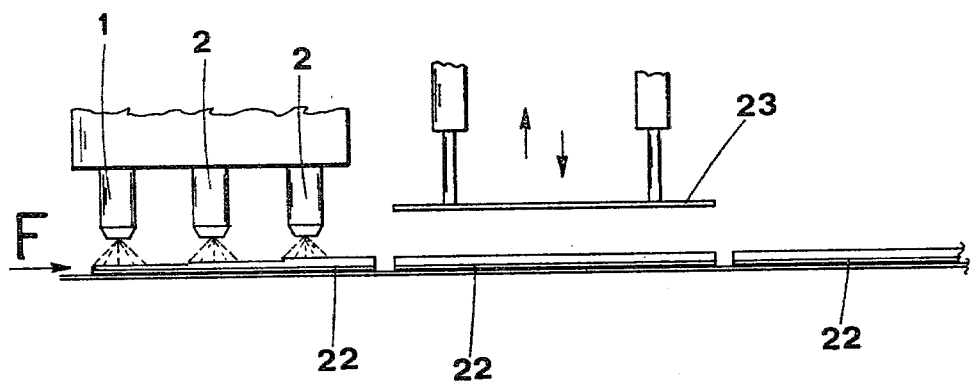
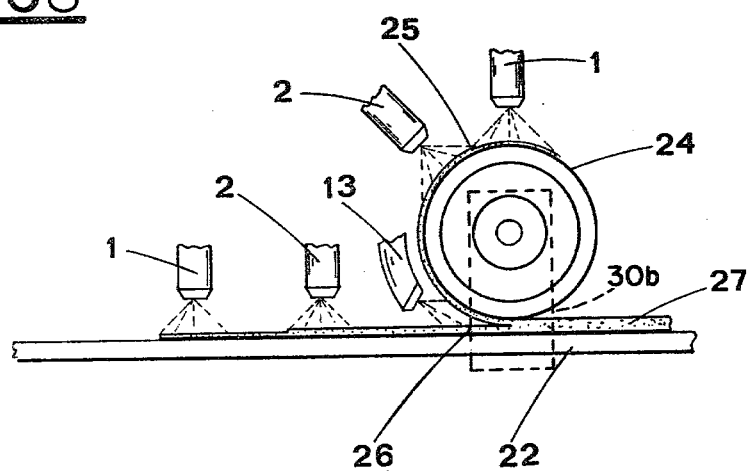

PROCESS FOR THE PRODUCTION OF COOKED MACARONI FOODS AND A PLANT WITH WHICH TO EFFECT THE SAID PROCESS

BACKGROUND OF THE INVENTION

The invention relates to a process for the production of cooked macaroni foods and to a plant with which to effect the said process.

DESCRIPTION OF THE PRIOR ART

The art presently in use for the production of macaroni foods consists in the preparation of a well amalgamated solid-plastic dough, composed of flour, water, eggs and other ingredients in different combinations and percentages to suit the product it is wished to make.

Once the said solid-plastic dough has been kneaded sufficiently, it is subjected to a rolling out operation in one or more successive stages, depending upon the desired thickness of the dough, which is then cut and formed or is extruded to directly supply a formed product, such as spaghetti or noodles etcetera.

The finished product thus obtained can be eaten immediately in its fresh condition, after being first cooked in water, or else be put on the market dried out so as to guarantee its being kept for a long time; anyway it can always only be eaten after a more or less long and complex period of cooking, depending upon the macaroni product used and the particular recipe chosen. Normally, however, no cooking, even partial, of the product takes place during the production thereof, except in certain special cases when the dough is cooked in water subsequently to the production rolling out or extrusion stage, prevalently for the preparation of canned or frozen "ready cooked dishes".

SUMMARY OF THE INVENTION

The object of the invention is to produce macaroni foods that are cooked partially or completely, according to the requirements, without water and without resorting to rolling out or extrusion operations to make the product in various forms, and wherein further cooking is not needed to eat it.

The said object is attained with the process forming the subject of the present invention, essential features of which are that the following stages are envisaged:

(a) the preparation of a liquid mixture containing the basic ingredients needed to make the macaroni product, using water or milk, or both, to dilute the mixture, and using at least one binding ingredient;

(b) the constant stirring of the said liquid mixture and, with the aid of one or more devices for nebulizing the said liquid mixture, the continuous or intermittent distribution of it onto at least one surface heated to the macaroni cooking temperature, with the said heated surface and the said nebulization devices moving, one with respect to the other, in such a way as to produce a continuous dough that is cooked, contemporaneously with the production thereof, directly on the said heated surface.

According to one possible form of embodiment, the plant with which to effect the said process is envisaged having a first surface heated to the macaroni cooking temperature, connected, without the possibility of displacement or slippage, one with respect to the other, to a first wheel rotatable with a continuous or intermittent unidirectional movement, and having the said nebulization devices positioned on the perimeter of the said wheel, opposite the said heated surface; a second surface heated to the macaroni cooking temperature, connected, without the possibility of displacement or slippage, one with respect to the other, to a wheel rotatable with a continuous or intermittent unidirectional movement, at the same speed, though in the opposite direction, as that of the wheel to which the first heated surface is connected, and connected to the said first wheel through transmission means that do not allow one to slip with respect to the other, the said second wheel being rotatable around an axis parallel to the axis of rotation of the said first wheel, the said second heated surface being so positioned as to face onto the said first heated surface, spaced away therefrom at a distance identical to the thickness of the product it is wished to make.

For the production of long products, such as spaghetti, products in strip form, such as noodles, and short products, contemporaneously with the formation and cooking stage it is envisaged that the said first and second heated surfaces be shaped in such a way as to circumferentially have a number of channels or pockets, separated by cutter members which, during the rotation of the said heated surfaces, divided the dough being formed and cooked thereon into pieces of the desired section, shape and length. Alternatively, the dough can be cut after it has been produced.

With the process and plant forming the subject of the present invention, it is possible to achieve the grouping together of the product forming, cooking and finishing stages, and in this way to limit what the consumer has to do just to adding a condiment to the product or, when it is not eaten in a fresh condition, placing the product in hot water for a few seconds in order that it may reacquire its "natural volume".

By using a liquid mixture, the process enables there to be an easier and more rapid amalgamation of the ingredients, while the subsequent nebulization makes it possible to produce a flexible, uniform, food that has better physical characteristics and nutritive properties than products made in accordance with the conventional art.

For the preparation of the liquid mixture there is not, in fact, any compulsory limitation in the use of ingredients such as, for example, eggs, in relation to the flour and, indeed, it is possible to use a higher percentage of eggs than is the case with conventional macaroni foods since there is no question of the mixture hardening or becoming sticky which, when adopting the processes known today, would prejudice the rolling out and/or the extrusion of the dough.

BRIEF DESCRIPTION OF THE DRAWINGS

The characteristics and advantages of the process forming the subject of the present invention will emerge more clearly from the detailed description that follows of various possible forms of embodiment for the plant with which to effect the said process, illustrated purely as unlimited examples on the accompanying drawings, in which:

FIG. 3 shows a further form of embodiment for the plant which, in practice, results from combining in series the possibilities outlined in FIGS. 1 and 2;

FIG. 5 shows, in a profile view, a possible way in which the heated surfaces can be shaped suitably to produce a long product, such as spaghetti;

FIG. 6 shows, in a profile view, a possible way in which the heated surfaces can be shaped and combined suitably to produce a long product, such as noodles;

FIG. 7 shows, diagrammatically, a further possible form of embodiment for the plant according to the invention, wherein the heated surfaces that contribute to the formation and cooking of the products are flat and movable, one with respect to the other;

FIG. 8 shows, diagrammatically, a further possible form of embodiment for the plant according to the invention, wherein the heated surfaces that contribute to the formation and cooking of the product are flat and circular, respectively, both being movable synchronously at the same speed and in the same direction.

DESCRIPTION OF THE PREFERRED EMBODIMENTS

The first stage for the process forming the subject of the present invention consists in preparing a liquid mixture of the ingredients needed for the production of macaroni foods; for the dilution of which water or milk, or both, can be used.

The individual quantities of the various ingredients will depend on the type of macaroni food it is wished to produce. An ingredient having a binding function is, furthermore, necessary in order to guarantee the nebulized mixture having adequate consistency. The said ingredients can, for example, simply be the whole egg, just the white thereof, or any other suitable edible substance.

The liquid mixture is stirred continuously in order to prevent it from stratifying and to constantly have available a dough to be nebulized, which is amalgamated as much as possible. The mixture can, if necessary, contain ancillary ingredients that are able to give the product a particular green or pink type of color, or a special protein-vitamin value. Thus, for example, various types of green vegetables can be used, as well as various sorts of flour, with care always being taken to maintain the necessary dilution and homogeneousness of the mixture.

The second stage in the process consists in forming the mixture into a finished product, that is to say, into a cooked macaroni food of the desired thickness.

To achieve this second stage, and with reference to the example given in FIG. 1, nebulizer devices as at (1) and (2) can be used, these being supplied from the tank in which the liquid mixture is contained (not depicted in the figures) whose task is to distribute the liquid mixture onto a working surface (3), the said nebulizer devices being placed one after the other. The said working surface (3) is shown in FIG. 1 in circular form, connected to a wheel (4) with a rotatory movement, and the former is subjected to the heating action of one or more sources of heat (5) of a suitable type which are placed in various positions in order to obtain a maximum distribution of the heat and uniformity of the temperature applied to the said working surface (3).

Distribution of the heat, uniformity of the temperature and the rotation speed are interdependent factors to enable the nebulized liquid mixture to be cooked perfectly and to subsequently be removed from the working surface (3), as well as, naturally, to allow there to be a satisfactory production rate.

The optimum temperature range for the cooking of the product is between 75° C. and 150° C. taken on the working surface (3) which obviously has to be made of high thermal conductivity material and be perfectly smooth. The said range of temperatures depends on the intrinsic characteristics of the mixture, on the speed at which the working surface (3) rotates and, therefore, on the optimum cooking temperature and times, as well as on the type of nebulization used.

During the second stage in the carrying out of the process in question, when the first layer of the mixture (6) distributed by the nebulizer device (1) comes into contact with the working surface (3), it tends to dry quickly (the water contained in it being vaporized, which contributes in rendering the mixture flexible) and to become the first cooked layer of the mixture, which subsequently facilitates the removal of the cooked dough (7) from the working surface (3).

With the example given in FIG. 1, various further layers are added to the first layer of the mixture by the nebulizer devices (2) until the thickness desired for the cooked dough (7) has been attained. The said subsequent layers contribute contemporaneously in preventing the first layer of the mixture (6) from drying out excessively since, if it were to become ultra-friable, the removal of the cooked dough could be rendered difficult. Again, according to the example given in FIG. 1, the wheel (4) that carries the cooked dough (7) is coupled to a second wheel (8) having a peripheral surface (8*a*), which also operates at the working temperature, in convergent rotation with the wheel (4), and at the same speed as this, the task of which is to give a finishing touch to the cooking of the upper surface of the cooked dough (7) and to facilitate its removal from the wheel (4) through the shrinkage effect of the fibers in the said cooked dough.

In order to prevent any slippage between the heated surfaces (3) and (8*a*), the wheels (4) and (8) can be connected to one another through the use of rigid transmission means of a known type, illustrated by the phantom representation 30.

According to the example illustrated in FIG. 2, the macaroni food is produced on two separate working surfaces (9) and (10) belonging to the wheels (20) and (21), respectively, which counter-rotate, one with respect to the other, and cause the two layers (11) and (12) to be stuck together, the union being assisted by the prior distribution of a further quantity of the liquid mixture through a nebulizer device (13), positioned suitably with respect to the said working surfaces.

The above described solutions can be adopted in succession, as shown in FIG. 3, in order to achieve the optimum cooking of the dough (14) and the thickness and finish desired for it. All of the wheels 4, 8, 20 and 21 are preferably connected to one another through the use of a transmission of a known type, illustrated by the phantom representation 30a, so that they all travel at the same speed of rotation without slippage.

It is necessary, at the time the nebulized liquid mixture is being distributed onto the working surface (3), or onto the working surfaces (9) and (10), that it does not "run" because of the amount being excessive and flow over the outside border, thereby giving rise to the formation of peripheral burr which would hamper the removal of the cooked dough.

Figure 1:
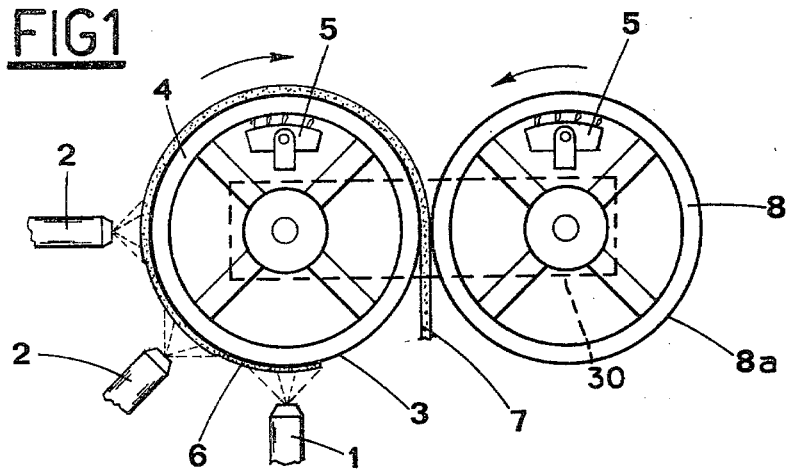
FIG. 1 shows, diagrammatically in a front view, a first form of embodiment for the plant according to the invention, wherein two heated surfaces are used, on only one of which the dough is sprayed for the formation and the cooking thereof.
Figure 2:
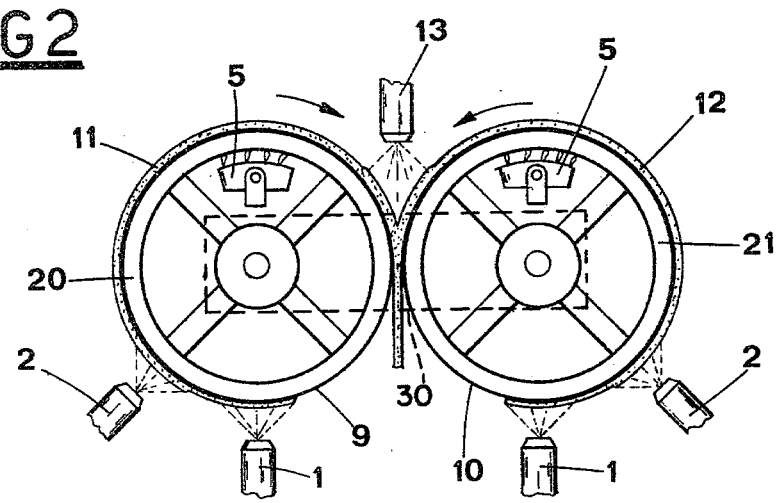
FIG. 2 shows, diagrammatically in a front view, a second form of embodiment for the plant according to the invention, wherein two heated surfaces are used, on both of which the formation and the cooking of the product takes place, and by means of which two thicknesses are created which are united when leaving the said heated surfaces, either by contact or because of the arrival of more of the nebulized mixture, to form one single thickness.
Figure 4:
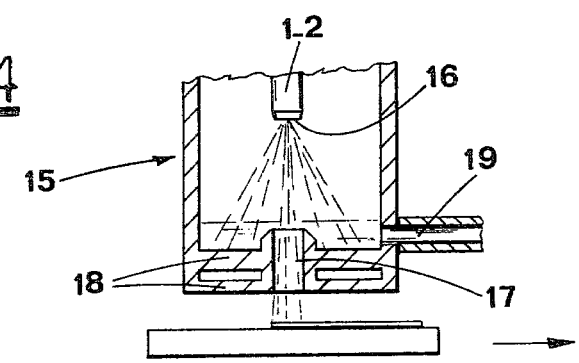
FIG. 4 shows, in a lateral diagrammatic view with some parts in sectional form so that others may be seen better, a possible form of embodiment for the nebulization devices.

In this connection, the devices shown by way of an example in FIG. 4 are provided, and with these, which are numbered (15) therein, it is possible to regulate and render uniform the jet of mixture coming from the nozzle (16) of the nebulizer device (1) or (2). The said devices (15) are provided at the bottom thereof, in the region of a mixture jet expulsion aperture (17), with heat insulation members (18) which are able to protect the liquid mixture collected therein, from the heat coming from the neighboring working surface. Furthermore, the said devices (15) have an exit duct (19) for the recovery of the excess liquid mixture accumulated therein.

Once the dough has been cooked contemporaneously with the production thereof in accordance with the foregoing description, one is able to proceed with the cutting and packing operation through the use of the normal techniques known today.

As regards the production of macaroni foods of the spaghetti, noodle, etcetera, variety, the formation operation normally performed at a stage subsequent to the production of the dough can, with the present invention also be achieved contemporaneously with the cooking by having the working surfaces (3), (4), (9) and (10) onto which the liquid mixture is sprayed, shaped and coupled one to the other (see FIGS. 5 and 6), to suit the desired shape, with the utmost attention being placed on guaranteeing the uniformity of the temperature and the smoothness of the surface.

Alternatively to the foregoing and with reference to FIG. 7, the working surfaces (3) and (4) can be replaced with the flat heated surfaces (22) and (23), positioned at different levels and connected to corresponding means of support.

A number of the surfaces (22) can be arranged, one after the other, suitably linked up to corresponding sources of heat, and connected to conveyor devices, not illustrated on the drawings, which move them in successive steps towards the surface (23), in the direction of the arrow F, underneath one or more nebulizer devices (1) and (2) placed, when there are several of them, one following on after the other, and actuated in synchronism with the forward movement of the said surfaces.

When the surface (22) arrives underneath the surface (23) and during the halting time of the said surfaces (22), the surface (23) is carried into contact with the upper face of the dough formed and being cooked on the surface (22), and this gives the finishing touch to the cooking of the other side of the said dough.

In another possible form of embodiment for the said plant, illustrated in FIG. 8, the said flat surface (23) is substituted by a circular surface (24), connected to corresponding means of support, not depicted, which is heated to the product cooking temperature through a source of heat positioned suitably with respect to the said circular surface, which is also not shown on the drawings. On the periphery of the said circular surface (24) one or more nebulizer devices (1) and (2), as in the cases described previously, can be placed, as well as one or more of the nebulizer devices (13) can be placed at the union of the parts (25) and (26) of the finished product (27), it not being wished to rely on the simple contact between the parts. In the latter event, the circular surface (24) contributes to giving the finishing touch to the cooking of the macaroni food under production in its desired shape. The drive of the moving surface 22 can be connected to the circular surface 24 to conform their movement by means of a transmission means of known type, illustrated by the phantom representation 30b.

What is claimed is:

1. A process for the production of cooked macaroni foods, wherein the normal basic ingredients are utilized in the preparation thereof, essential features of the process being that it comprises the following steps:
   (a) preparing a liquid mixture containing the ingredients needed to make the macaroni product, using water or milk, or both, to dilute the mixture, and using at least one binding ingredient;
   (b) constantly stirring the liquid mixture, and
   (c) with the aid of one or more devices for nebulizing the liquid mixture, continuously or intermittently spraying the liquid mixture onto at least one surface heated to the macaroni cooking temperature, with the heated surface and the nebulization devices moving, one with respect to the other, in such a way as to produce a continuous product that is cooked, contemporaneously with the production thereof, directly on the heated surface.

2. A process in accordance with claim 1, wherein said spraying step includes spraying the mixture through at least two of the devices for nebulizing the liquid mixture disposed consecutively in the moving direction of the heated surface such that the thickness of the product being sprayed increases as the heated surface passes each nebulizing device.

3. A process in accordance with claim 1, further including the step of contacting the product formed on the heated surface with a second heated surface.

4. An apparatus for the production of cooked macaroni foods, comprising:
   at least one heated surface;
   nebulizing means for nebulizing a stirred liquid mixture containing the ingredients needed to make a macaroni product and for spraying the nebulized mixture toward at least one said heated surface; and
   moving means for causing said heated surface being sprayed to move in relation to said nebulizing means in such a manner as to cause distribution of the mixture onto said heated surface at a desired thickness,
   wherein said nebulizing means comprises at least two nozzles disposed consecutively in the moving direction of said heated surface such that each nozzle downstream of another serves to increase the thickness of the macaroni product being sprayed onto said heated surface;
   whereby a continuous cooked dough is produced, contemporaneously with the production thereof, directly on the heated surface, the thickness of the product being determined by the number of nozzles disposed in the moving direction of said heated surface.

5. An apparatus in accordance with claim 4, wherein said at least one heated surface comprises:
   a first surface heated to the macaroni cooking temperature, connected to a first wheel rotatable with a continuous or intermittent unidirectional movement, wherein said nebulization means are positioned on the perimeter of said wheel, opposite said heated surface; and a second surface heated to the macaroni cooking temperature, connected to a second wheel rotatable with a continuous or intermittent unidirectional movement, at the same speed, though in the opposite direction, as that of said first wheel, said second wheel being rotatable around an axis parallel to the axis of said first wheel, said second heated surface being so positioned as to face onto said first heated surface, spaced away therefrom at a distance identical to the thickness of the product formed on said first heated surface; and wherein the apparatus further includes transmission means for causing said second wheel to move at the same speed as said first wheel, but in the opposite direction thereto.

6. An apparatus in accordance with claim 4, wherein said at least one heated surface comprises:

a first surface heated to the macaroni cooking temperature, connected to a first wheel rotatable with a continuous or intermittent unidirectional movement; and a second surface heated to the macaroni cooking temperature, connected to a second wheel rotatable around an axis parallel to the axis of said first wheel with a continuous or intermittent unidirectional movement in the opposite direction to that of said first wheel, said first and second heated surfaces being positioned to face one another, spaced away from one another at a distance identical to the sum of the thicknesses of the product being formed and cooked thereon;

wherein one or more of said nebulizing means are positioned on the periphery of said first and second wheels, in such way as to face onto said first and second heated surface, oriented theretowards; and wherein the apparatus further includes transmission means for causing said second wheel to move at the same speed as said first wheel, but in the opposite direction thereto.

7. An apparatus in accordance with claim 4,
wherein said at least one heated surface comprises:
a first pair of surfaces heated to the macaroni cooking temperature, each connected to a corresponding wheel rotatable with a continuous or intermittent unidirectional movement, said wheels being rotatable around axes parallel with each other, in the opposite rotation direction, one with respect to the other, said heated surfaces being so arranged as to face onto each other, one spaced away from the other at a distance less than the thickness of the product it is wished to produce; and a second pair of surfaces heated to the macaroni cooking temperature, placed downstream with respect to said first pair and each connected to a corresponding wheel rotatable with a continuous or intermittent unidirectional movement, said second pair of wheels being rotatable around axes parallel with each other, in the opposite rotation direction, one with respect to the other, at the same peripheral speeds as the wheels to which the surface of the first pair of heated surfaces are connected, the heated surfaces of said second pair being so arranged as to face one another and to be positioned symmetrically with respect to the directrix defined by the product exiting from the first pair of heated surfaces, interspaced at a distance identical to the final thickness of the macaroni food it is wished to produce;

wherein one or more of said nebulizing means are positioned on the periphery of one of said first pair of wheels, facing one of said heated surfaces and oriented theretowards and one or more of said nebulizing means are positioned on the periphery of both said second pair of wheels to which said second pair of heated surfaces are connected, in such a way as to face said surfaces, oriented theretowards; and wherein the apparatus further includes first transmission means for causing the wheels of said first pair of surfaces to move at the same speeds in opposite directions and second transmission means for causing the wheels of said second pair of surfaces to move at the same speeds and in opposite directions, said speed being the same as that of said first pair of wheels.

8. An apparatus in accordance with one of claims 6 or 7, wherein there is at least one nebulizing means placed between said first and second heated surfaces and oriented towards the confluence area of the two parts of the product being formed and cooked on said surfaces, and in the process of being united to one another.

9. An apparatus in accordance with one of claims 5 to 7, wherein said heated surfaces have a contour such as to define the shape of the cutting of the product during the movement of one with respect to the other.

10. An apparatus in accordance with claim 4, wherein said at least one heated surface comprises at least one flat surface heated to the macaroni cooking temperature, movable with an intermittent unidirectional movement; wherein said nebulizing means is placed above said heated surface, oriented theretowards, and operating in synchronism with the movement phases of said conveyor; wherein said moving means causes said flat heated surface to move in an intermittent unidirectional movement; and further including at least a second flat heated surface, placed to follow on after said nebulization device, movable in the direction toward said first heated surface when the latter is underneath the former, and during the halting times of said moving means to which said first heated surface is connected, said second heated surface being movable from a first position in which it is far away from the first heated surface, to a second position in which it is close thereto, the separating distance being identical to the thickness of the product being formed and cooked on said first heated surface.

11. An apparatus in accordance with claim 4,
wherein said at least one heated surface comprises:
at least one flat surface, heated to the macaroni cooking temperature and movable with a continuous or intermittent unidirectional movement; and at least a second circular surface, heated to the macaroni cooking temperature, supported by a wheel rotatable around its axis in synchronism with the movement of the said flat surface, said circular surface being rotatable in a direction that conforms with the movement direction of said flat surface, and being spaced away therefrom at a distance identical to the thickness of the finished product it is wished to make;

wherein at least one of said nebulizing means is positioned with respect to said heated flat surface such as to be oriented theretowards, said nebulization means operating in synchronism with the movement of said flat surface;

wherein one or more of said nebulizing means are positioned on the periphery of said circular surface in such a way as to face and be oriented theretowards; and wherein the apparatus further includes transmission means for causing said circular surface to move at the same speed as said flat surface and in the same direction at the point of closest approach.

12. An apparatus in accordance with claim 4, wherein said nebulization means are provided with means that limit the range over which the liquid mixture is distributed onto said heated surfaces, said means being provided, in the region of the sides thereof turned towards the heated surfaces, with insulating surfaces for keeping the temperature of the nebulized liquid under control and, furthermore, with an exit duct for the recovery of the excess liquid mixture accumulated therein.

13. An apparatus in accordance with claim 4 wherein said at least one heated surface comprises at least two heated surfaces, said nebulizing means spraying the nebulized mixture toward at least a first said surface, and wherein at least a second said surface is so disposed as to cause contact of said second surface or any macaroni product thereon with the macaroni product on said first surface.

14. An apparatus in accordance with claim 4 wherein each of said nozzles continuously sprays nebulized mixture onto the heated surface, and wherein said moving means causes said heated surface to continuously move in relation to said nozzles to thereby cause a continuous product to be produced.

* * * * *

UNITED STATES PATENT AND TRADEMARK OFFICE
CERTIFICATE OF CORRECTION

PATENT NO. : 4,311,719
DATED : January 19, 1982
INVENTOR(S) : Sergio FALCONI

It is certified that error appears in the above-identified patent and that said Letters Patent are hereby corrected as shown below:

Claim 8, lines 1-2, "6 or 7" should read --6, 7 or 11--

Signed and Sealed this

First Day of June 1982

[SEAL]

*Attest:*

GERALD J. MOSSINGHOFF

*Attesting Officer*     *Commissioner of Patents and Trademarks*